C. MACBETH.
VEHICLE WHEEL.
APPLICATION FILED JAN. 4, 1919.
1,305,820.
Patented June 3, 1919
3 SHEETS—SHEET 1.
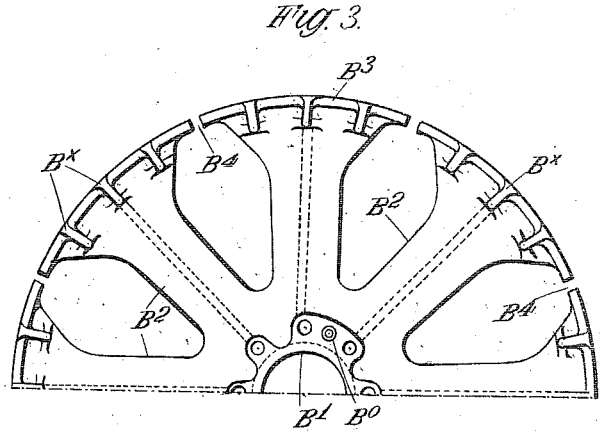
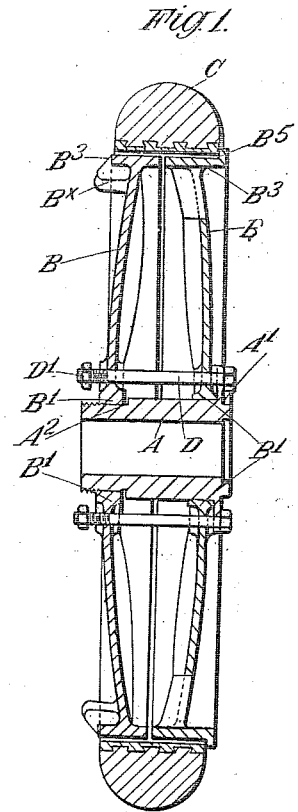
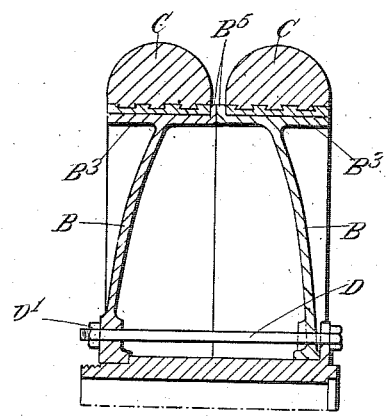
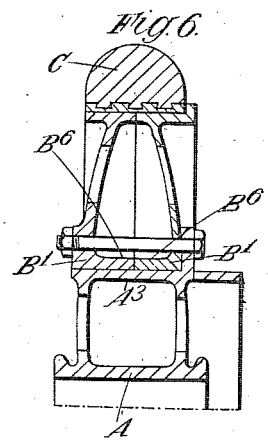

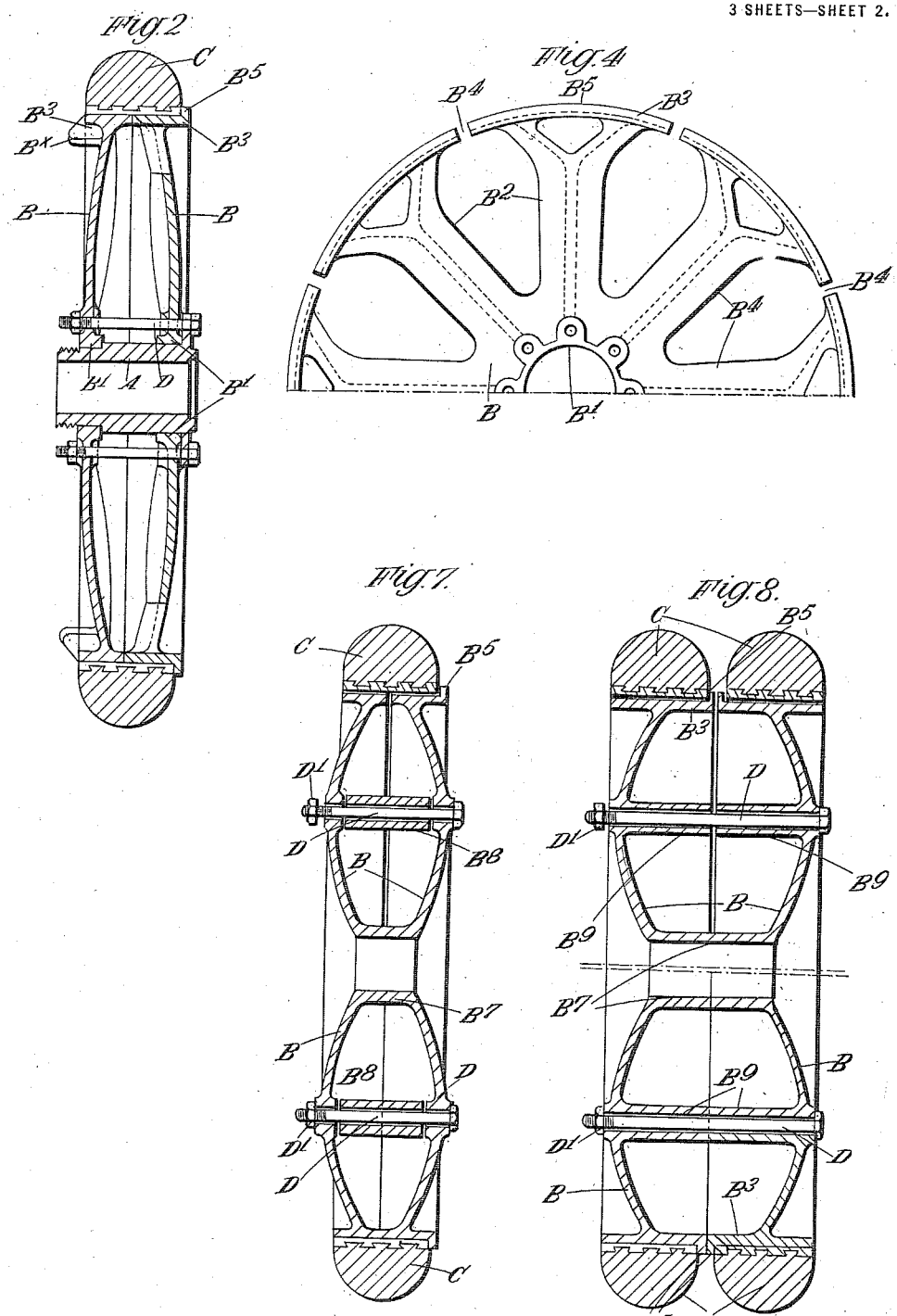

C. MACBETH.
VEHICLE WHEEL.
APPLICATION FILED JAN. 4, 1919.
1,305,820.
Patented June 3, 1919
3 SHEETS—SHEET 3.
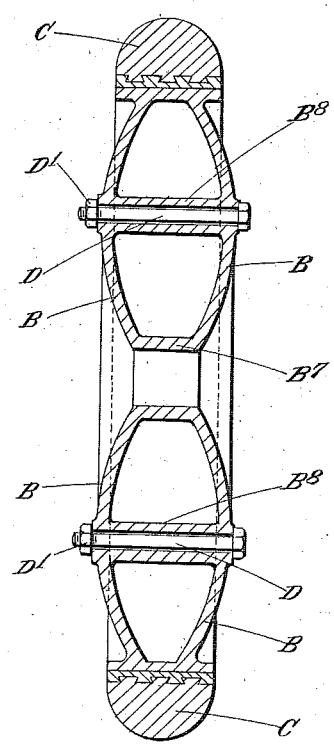
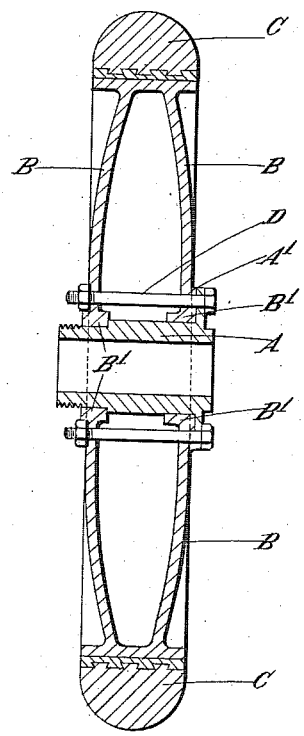

UNITED STATES PATENT OFFICE.

COLIN MACBETH, OF BIRMINGHAM, ENGLAND, ASSIGNOR TO THE DUNLOP RUBBER COMPANY, LIMITED, OF WESTMINSTER, LONDON, ENGLAND.

VEHICLE-WHEEL.

1,305,820.   Specification of Letters Patent.   Patented June 3, 1919.

Application filed January 4, 1919. Serial No. 269,590.

*To all whom it may concern:*

Be it known that I, COLIN MACBETH, a subject of the King of Great Britain, residing at Para Mills, Aston Cross, Birmingham, in the county of Warwick, England, have invented certain new and useful Improvements in or Relating to Vehicle-Wheels, of which the following is a specification.

This invention relates to metal vehicle wheels, the chief object being to provide an improved construction of wheel which enables a solid rubber tire to be readily attached to or removed from the wheel without employing a hydraulic press which is generally used for this purpose. The invention is however applicable to metal wheels adapted to receive pneumatic tires as the improved construction of the wheel enables detachable rims carrying the pneumatic tires to be readily attached to or removed from the wheel.

According to the present invention, the improved wheel comprises spoke members or the equivalent thereof, formed separately or in one piece and in one or rigid with an annular portion or portions to surround the wheel hub or axle or other suitable seating, the construction and arrangement of the spoke members also being such that the outer part or parts around which the tire base or rim is adapted to be seated is or are incapable of or can be retained against transverse or axial adjustment or movement so that by applying a transverse or axial thrust or pressure to the spoke members, the latter can be radially expanded to cause the said outer part or parts to bear against the tire base or rim with such pressure as to secure and retain the tire in position on the wheel. The spoke or equivalent members which may be in the form of oppositely dished or coned plates may be provided with transverse slits, gaps or the like extending through the outer part and the spoke members but not through the said hub or annular portion, so that by applying the transverse or axial thrust or pressure at the point where the spoke members are dished or coned to the maximum extent, the spoke members can be radially expanded to cause the outer or rim part to firmly grip or bear against the tire base or rim. As aforesaid the spoke or equivalent member may be constructed in one piece to form a single structure and in some cases this single piece structure may be circumferentially divided at a suitable part and when the division is made at the outer or rim part the radial expansion of the spoke members is not effected until the circumferentially divided rim portions abut against each other or against suitable stops or parts on the tire base or rim. The wheel need not be constructed in one piece but may be divided vertically to provide two separate members each comprising one set of the spokes or the equivalent with a suitable ring-like or hub portion at the inner or central part and with suitable outer parts for engaging with the tire base or rim. In this case also the radial expansion of the spoke members is not effected until the outer or rim parts are retained against transverse or axial displacement. The means for effecting the radial expansion of the spoke members may comprise a number of bolts or screws passing through the oppositely dished or similar spoke members, by means of which bolts or screws the spoke members can be transversely moved in opposite directions to effect the radial expansion thereof. Other means may however be provided for applying the transverse or axial thrust or pressure to the spoke members for effecting the radial expansion thereof. To remove the tire from the wheel the bolts or other means for effecting the radial expansion of the spoke members are manipulated to allow the spoke members to contract or assume their normal positions thus relieving the pressure or grip on the tire base or rim and enabling the tire to be readily removed. If desired forcing screws may be employed to effect or assist in effecting the contraction of the spoke members.

The spoke members either when separate or constructed in one piece may be as above stated in the form of oppositely dished or coned plates and the aforesaid transverse slits or gaps may be quite narrow in a circumferential direction, so that the wheel has the appearance of a disk wheel. Alternatively, the transverse gaps may be quite wide circumferentially so as to leave radial members which form the spokes of the wheel in which case the outer part of the spoke members may have segmental portions to form the seating for the tire base or rim. The expression "spoke or equivalent members" is to apply to any such arrangement.

In order that the invention may be clearly understood and readily carried into effect, the same will be described more fully with reference to the accompanying drawings, in which:—

Figures 1 and 2 are transverse sectional views of one construction of the improved wheel having a solid rubber tire showing respectively the unexpanded and expanded positions of the spoke members.

Figs. 3 and 4 illustrate half views of the two sides of the wheel shown in Figs. 1 and 2.

Figs. 5 to 10 illustrate various modifications.

A represents the hub surrounding the wheel axle. B, B represents the two spoke members which as shown are dished outwardly and C represents the solid rubber tire with its metal foundation base or band. In the example shown in Figs. 1 and 6, the wheel is vertically divided so as to provide two separate spoke members, each member B being formed in one with an annular or ring-like portion B′ to fit over the hub A and in one with a rim or felly B³ at the outer part. Each member B of the wheel is provided with gaps B² extending to near the annular portion B′ but not through it so as to form separate radial spokes extending from the annular portion B′, and the outer or rim portions B³ are transversely divided at points B⁴ (see Figs. 3 and 4), so as to provide segmental rim parts, these openings B² and B⁴ being provided to permit of the radial expansion of the spoke members as hereinbefore described. The two spoke members B, B when constructed as shown in Fig. 1 are placed side by side on the hub A so that the rim portions may be brought into contact, one member, say the inner one bearing against an abutment or flange A′ on the hub, and the other or outer member being so disposed that its inner or central part lies adjacent to and not in contact with a shoulder A² formed on the hub. In the case of a single tire wheel, the segmental rim portions B³ of each member B are equal in width to about half the width of the base of the tire C which is placed around the rim portions B³ when the members B are in the unexpanded positions (see Fig. 1). All or some of the segmental rim portions B³ of the inner spoke member B may be formed with a peripheral abutment B⁵. Against which one side of the tire base or band bears when situated around the rim portions B³, to insure correct positioning of the tire, although these abutments are not essential and can be dispensed with if desired. In the case of a twin tire wheel shown in Fig. 5, each circumferential set of rim portions B³ receives a separate tire and if desired, each set of the rim portions B³ may be formed with a peripheral abutment B⁵ against which the tires are placed. When the members B are in position on the hub, bolts D are passed through holes in the hub flange A′ and through the two members B, B the heads of the bolts bearing against the hub flange A′. By screwing up the nuts D″ on the bolts D, a transverse or axial thrust or pressure can be applied to the spoke members B, B with the result that the outer member B is moved toward the other or inner member B and when its peripheral or rim portions B³ are in contact with the rim portions B³ of the inner member B, the transverse thrust or movement effected by the screwing up of the nuts, causes the spoke members to expand radially with the result that the rim portions B³ are forced outwardly in a radial direction without being moved transversely, so as to bear firmly against the base or band of the tire, and in this manner the tire can be securely held on the wheel. The outer member B coming into contact with the shoulder A² on the hub, insures uniformity of the expanding movement. The construction above described insures a uniform tension or compression on all parts of the wheel. Each dished member B joins with its rim portions B³ at approximately midway across the width of the latter, so that during the radial expansion of the spoke members, the rim portions can to some extent, move angularly about the said midway points of connection without moving transversely or axially and thus adapt themselves to engage evenly with the tire base or band, so as to provide a satisfactory bearing surface. Instead of providing the shoulder A² on the hub, both members B, B may be formed with inwardly directed distance pieces such as B⁶ see Fig. 6, surrounding the hub A or a seating A³ formed in one with the hub as shown in Fig. 6 which distance pieces on coming into contact insure uniformity of the expanding movement as aforesaid. The movement of the members B, B may be effected by one bolt and nut, or by any other suitable means which enable the transverse thrust or pressure to be applied to the spoke members; as shown in Fig. 3, a threaded hole B⁰ may be provided to receive a bolt or screw, which may be used for forcing off purposes. Although the spoke members with the inner ring portion B′ and the outer or rim portion B³ are shown as separate members, it will be understood that they may be constructed in one piece as shown in Fig. 9 which illustrates a wheel generally similar to that shown in Figs. 1 and 2 which may be provided with radial and transverse slits or gaps, the two spoke members being oppositely dished or coned and joined together; the radial expansion of the joined spoke members is effected by applying a transverse or axial thrust to the members preferably at the point where they are dished or coned to the maximum extent by means of bolts and nuts as aforesaid or by any other appropriate means.

The example shown in Fig. 7 illustrates one construction of the improved wheel in which the two spoke members B B are constructed in one piece by being joined or connected together in this case by a hub portion B⁷. In this example, as shown, the rim portions B³ are circumferentially divided and the spoke members B, B are made of double dished or conical formation so that they are dished or coned to the maximum extent at a point approximately midway between the hub and the rim portions. In this arrangement, the radial expansion of the spoke members may be effected by means of bolts D extending through the dished spoke members at points midway between the hub and the rim portions, and upon the rim portions abutting or coming into contact with a suitable stop or parts which may be provided on the tire base, the spoke members can be caused to expand radially by screwing up the nuts D' on the bolts D so that the rim portions move outwardly in a radial direction to bear against and grip the tire base, without moving transversely during the radial expansion of the spoke members. In this example, sleeves B⁸ may surround the bolts D and constitute stops which insure uniformity of the expanding movement. The upper half of Fig. 7 shows the wheel unexpanded, while the lower half illustrates the wheel in the expanded condition. Fig. 8 illustrates a further modification of the wheel which may be adapted to receive twin tires, and in this example, the members D are formed with bosses B⁹ through which the securing bolts D are passed, these bosses being adapted to come into contact to insure uniformity of the expanding movement. The upper half of Fig. 8 shows the spoke members constructed in one piece by means of a common hub B⁷, and in this case the rim portions may if desired be circumferentially divided. The lower half of Fig. 8 shows a similar construction in which the members are constructed separately, each member being formed with half the hub portion B⁷.

The circumferential division or separation of the outer or rim parts of the spoke members is not essential or necessary owing to the fact that no transverse or axial movement of the rim parts takes place during the radial expansion of the spoke members. Therefore the outer parts of the spoke members may be joined by a common rim part as shown in Fig. 10 which shows a wheel generally similar to that shown in Fig. 7. When the circumferential division is made the rim parts need not abut against each other but may be limited as regards transverse or axial movement by engaging with suitable parts or stops which may be conveniently formed or provided on the tire base or rim. The members B may be of any suitable formation, for example they may be formed as disks or plates having the radial and transverse gaps to permit of the radial expansion, and when the members are constructed to form radial spokes as shown in Figs. 3 and 4, the spokes may be strengthened by radial ribs on the insides or outsides thereof. Abutments or projections Bˣ may extend laterally from the rim portions B³ (see Figs. 1 and 2) to protect the wheel and tire from damage in the case of contacting with curbstones or other road obstructions. Although the invention is illustrated as applied to wheels having solid rubber tires, it can be equally well applied to wheels having pneumatic tires, in which case the pneumatic tire may be fitted in a detachable rim adapted to be engaged by the radial expansion of spoke members having at their outer parts suitable portions on a suitable portion for engaging with the detachable rim.

What I claim and desire to secure by Letters Patent of the United States is:—

1. A metal vehicle wheel comprising two continuous annular hub members, oppositely dished spoke members integral with and radiating from the hub members, the peripheral ends of said spoke members being adapted to be surrounded by a tire band and provided with transverse slits that extend inward to, without penetrating, the annular hub members, and means for exerting pressure in a transverse direction on the oppositely dished spoke members to expand them radially against said tire band while the outer portions of the spoke members are held against transverse movement.

2. A metal vehicle wheel comprising a hub sleeve, oppositely arranged double dished side plates, formed integral with said sleeve and separated to the maximum extent between the hub and peripheries of the plates, a rim band arranged about the peripheries of said plates, and bolts extending across the space separating said plates and provided with means for exerting pressure therein to expand them radially against the rim.

3. A metal vehicle wheel comprising a hub sleeve, oppositely arranged double dished side plates, formed integral with said sleeve and separated to the maximum extent between the hub and peripheries of the plates, a rim band arranged about the peripheries of said plates, bolts extending across the space separating said plates, at approximately the widest portions thereof, and provided with means for exerting pressure on the plates to expand them radially against the rim band, and sleeves surrounding the bolts and acting as stops to limit lateral movement of the plates.

4. A metal vehicle wheel hub comprising integral hub, side and rim sections, the sides being oppositely dished and separated to their maximum extent at points approximately midway between the hub and rim, a tire band peripherally surrounding the rim, and means for exerting lateral pressure on the sides to effect close radial contact with the tire band.

5. A metal vehicle wheel comprising spoke members so shaped that they can be caused to radially expand by applying a transverse or axial thrust or pressure to them at a point situated approximately midway between the hub and the rim portion of the wheel, substantially as and for the purpose specified.

COLIN MACBETH.